May 11, 1965  P. P. AMBROSE  3,182,523
WHEEL LOCKING DEVICE
Filed March 19, 1963
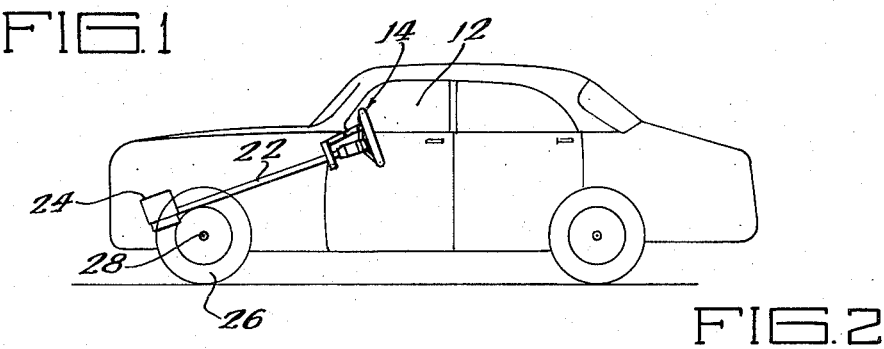
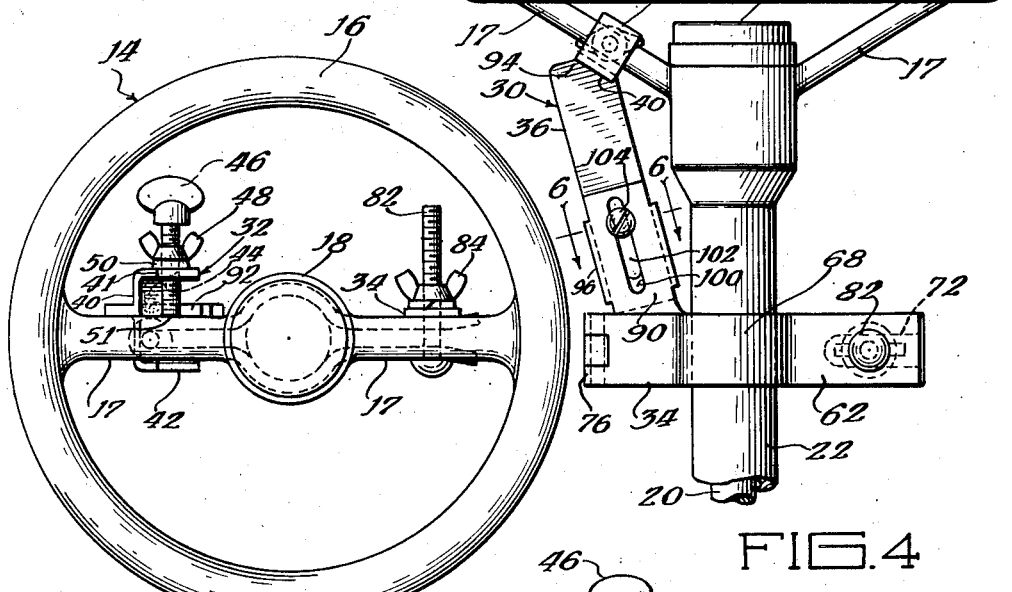
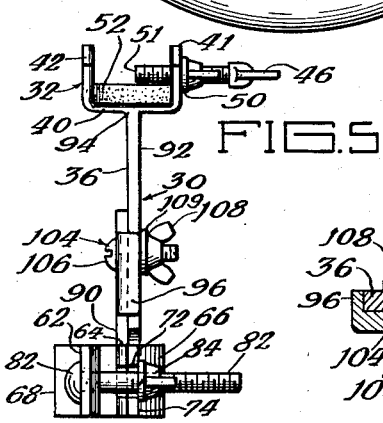
Inventor:
Peter P. Ambrose
By: Stone, Nieman,
Burmeister & Zimmer
Attorneys

United States Patent Office 3,182,523
Patented May 11, 1965

3,182,523
WHEEL LOCKING DEVICE
Peter P. Ambrose, 8416 Manistee Ave., Chicago, Ill.
Filed Mar. 19, 1963, Ser. No. 266,323
2 Claims. (Cl. 74—495)

The present invention relates to wheel locking devices and more particularly to devices for clamping the front wheels of a motor vehicle in a position having a fixed angular relationship with the longitudinal axis of the vehicle and in which position, the wheels of the vehicle are free to rotate with the motion of the vehicle and in which the clamping action inhibits all other motion of the wheels.

The invention has particular utility for vehicles such as trucks, automobiles, tractors or the like which are to be towed. It is quite well known that one towing practice, necessary with certain defects in the vehicle being towed, is to raise the rear end of the vehicle on the tow lift and to allow the front wheels of the vehicle to rotate as the tow progresses. In this condition, the front wheels are free to change their angular relationship with the vehicle longitudinal axis while retaining their rolling position parallel to the line of travel of the vehicle. If the wheels are originally cocked with respect to the longitudinal axis of the vehicle, the vehicle itself will assume a position with its axis oblique to the line of travel of the vehicle. In this condition, the tow is hard to control safely as the auto may shift positions or veer. Even when the wheels are set originally with respect to the vehicle axis, turning a corner or hitting a bump may jar the steering system of the vehicle and pivot the wheels with respect to the vehicle longitudinal axis. The wheels maintain their position parallel to the direction of travel of the vehicle and the vehicle itself must shift to accommodate this changed steering reaction. The shifting of the car position is a dangerous occurrence and may lead to the side-swiping of passing autos or to other similar accidents.

In the past, generally similar devices have taken the form of clamps or locks applied to the front wheels of a vehicle to secure the wheels to the frame of the vehicle mainly for the purpose of theft prevention. A number of problems are presented by such devices in that autos, trucks and tractors, to name a few of the vehicles on which the device may be used, vary greatly in their relative dimensions and positioning of their parts. To be universal in application, the lock or clamp must inherently allow for this difference in dimension and positioning. Further, this form of lock must be applied from beneath the vehicle and necessitates that the user climb beneath the vehicle to install and remove the clamp. In addition, such clamps are used in the steering system outwardly of the steering gear mechanism and the mechanical advantage inherent therein; thus any force applied to the wheels by the vehicle motion must be countered by an equal and opposite countering force.

It is, therefore, an object of the invention to provide a device for locking the position of the front wheels of a motor vehicle in a position with respect to the vehicle longitudinal axis, wherein the device may be applied to all vehicles regardless of the positioning of the wheels with respect to the vehicle frame.

It is another object of the invention to provide a novel and improved clamping device for use on the steering system of a motor vehicle which locks the wheels from movement out of a fixed angular relationship with the vehicle longitudinal axis.

It is a further object of the invention to provide a novel device for locking the wheels of an auto or truck from movement out of a fixed angular relationship with the auto axis, wherein the device may be applied within the drive compartment of the auto.

It is a still further object of the invention to provide a device for maintaining the wheels of a motor vehicle in a preset angular position with respect to the vehicle longitudinal axis in which the device utilizes the mechanical advantage inherent in the vehicle steering system to counter tendencies of the wheels to leave the set position.

It is a further object of the invention to provide a front wheel locking device which allows the wheels to rotate about their respective axes but which inhibits all pivotal motion of the wheels with respect to the longitudinal axis of the vehicle, wherein the device is applied to the steering wheel of the vehicle and locks the steering wheel from rotational motion.

To effect these and other objects, the present invention utilizes a clamping device which has one section which locks about the stationary steering column housing. From this section, a rigid connector leads to a second section which clamps to the vehicle steering wheel along one of its spokes. In this way, the steering wheel is locked in one position and as a result the front wheels will be held in one position by the clamping action until the clamp is removed. The clamp is applied within the driving compartment of the vehicle in a simple manner, effectively utilizing the mechanical advantage of the steering system to overcome the turning force on the wheels with a minimum of applied force. In addition, the device is adjustable in each of its clamps and in the rigid connection to allow the device to be applied to all manner of trucks, autos and the like regardless of the varying positions of the steering wheel in the drive compartment.

These and other objects, features and advantages of the invention will become apparent from the detailed description of a presently preferred embodiment of the invention when viewed with respect to the accompanying drawings, in which:

FIGURE 1 is a side elevational view of an automobile with some interior elements shown through the body in diagrammatic form;

FIGURE 2 is a side elevational view of a steering wheel of the automobile with a clamping device of the current invention in place;

FIGURE 3 is a top plan view of the steering wheel and clamping device of FIGURE 2;

FIGURE 4 is a top plan view of the clamping device of FIGURES 2 and 3;

FIGURE 5 is a front elevational view of the device of FIGURE 4; and

FIGURE 6 is a sectional view taken along the line 6—6 of FIGURE 2.

Turning to the figures in greater detail, there is shown a typical automobile 10 in which there is a driving compartment 12 containing a front seat and a steering wheel 14 easily accessible therefrom. The steering wheel, as is conventional, has a solid peripheral circular rim 16 from which a plurality of spokes 17 extend inwardly to connect to a wheel hub 18. The wheel hub 18 is suitably connected through the medium of a central steering column 20 which is rotatable about its axis to rotate the steering wheel 12 or vice versa. The steering column is encased in a coaxial, tubular steering column housing 22 which is stationarily affixed to the automobile body or frame. The steering column 20 is freely rotatable within the housing 22 which protects, supports and journals the steering column 20. Column 20 extends forwardly and downwardly with the housing to a connection to a conventional steering gear mechanism, shown as rectangle 24. Such mechanism, as is generally known, converts the rotation of the steering column into joint pivotal motion of the front wheels 26, the pivotal motion of the wheels changing the angular relation of the wheels and the longitudinal axis of the automobile 10. The wheels 26 are, of course, rotatable about their respective axes 28 as driven by the engine (not shown) of the vehicle in a known manner. The front wheels also will rotate freely about their central axes 28 when the automobile 10 is towed or pushed. The previously described auto construction is conventional in most autos and trucks in use today and has been presented as an example of the operative environment in which the invention to be described functions.

The clamping device 30 of the present invention is shown in FIGURES 2 and 3 connected to the steering wheel 14 and the steering column housing 22. It can be seen that the clamping device 30 includes an upper clamping section 32 adapted to clamp to a steering wheel spoke 17, a lower clamping section 34 locking about the stationary housing and an intermediate rigid arm 36 extending between the clamping sections. The device may be fabricated of steel or iron flat bar stock ½"×1½" to provide the desired rigidity.

FIGURES 4 through 6 show the construction of the clamping device 30 in detail. The device 30 as mentioned previously, includes an upper section 32, a lower section 34 and an intermediate arm 36. Upper section 32 is channel shaped with a horizontal base plate 40, over two inches in length, at each end of which there is an upright bar 41 and 42 respectively, each of which is at least one inch in height. The channel section 32, as shown in FIGURE 5, is integrally constructed with the upright bars comprising formed sections of the same flat bar as the base plate 40. This channel is of sufficient width, as set out, to insure that the channel section can accommodate spokes of any of the commonly used sizes of steering wheels. At approximately the center of one upright bar 41 there is provided a threaded hole 44 into which a threaded thumb screw 46 is fitted for movement toward or away from the opposed upright 42 parallel to base plate 40. The head of thumb screw 46 is outside the channel and under the head there is threadedly placed a wing nut 48 which tightens against a suitable strengthening emboss 50 on the outside of upright 41 coaxial to the threaded screw hole 44. The wing nut is used to lock the thumb screw firmly in place once the screw is tightened against the spoke 17 of a steeringf wheel. The spoke 17 rests against the inside of upright 42 and is held tightly against this upright by the flattened lead tip 51 of thumb screw 46. Finally, the inside of the channel section 32 may be lined with a suitable liner 52 of tough material which will prevent marring the spoke on tightening of thumb screw 46, said liner also being soft.

The lower clamping section 34 includes two parallel, equal length, arms 60 and 62 which are over six inches in length. The arms 60 and 62 are mutually hinged together at their end outwardly of the connection to intermediate arm 36. Only one of these arms, arm 60, is connected to the intermediate arm 36, the connection 64 being a permanent one which may be a welded connection from arm 36 extends obliquely in the same plane in which arm 60 extends for most of its length. Arm 60 has an arched section 66 toward its mid area, the arched section presenting a concavity facing the parallel arm 62. Arm 62 also has an arched midsection 68 facing concavity 66, the two arched sections forming a substantially circular opening 70 when arms 60 and 62 are placed parallel and adjacent to one another.

At its free end, arm 60 has a slot 72 extending from the end 72 opposite its connection to the intermediate arm 36, the slot extending about half the way from the end 72 of arm 60 to the arched section 66. This slot terminates in a curved end, and is adapted to hold therein a bolt as will be explained. The free end 74 of arm 60 may be flared slightly outwardly from the adjacent arm 62 to facilitate the prying apart of the arms 60 and 62 when necessary.

The other arm 62 of the lower section 34 is hinged to arm 60 at a hinge connection 76 which allows arm 62 to be moved to or away from arm 60 and intermediate arm 36. Arm 62 is parallel to arm 60, is generally shaped similarly although the arms have a left and right relationship within the arched sections 66 and 68 oppositely set to form the circular opening 70 between the arms 60 and 62. These arms may be separated at their free (unhinged) end to a width sufficient to accommodate therein steering column housing of any size used commonly. Near its free end, arm 62 has a square opening 80 confronting the slot 72. This opening is sized to accept the square underhead of a carriage bolt 82, the shaft of the bolt extending through slot 72 where a wing nut 84 is threaded onto the bolt to lock the arms 60 and 62 together.

It may be noted that the inner walls of the arched midsections 66 and 68 forming the circular opening 70 are lined with a layer 86 of tough material, this material being the same as lining 52. This liner includes an arcuate sheet within arched section 66 and a similar liner within the opposed arch section 68. Again, the purpose of the liner is to prevent scoring and marring of the automobile element about which the section is clamped, in this case, the steering column housing 22.

The intermediate arm 36, as it has been called, includes two beams 90 and 92, joined to allow relative slide movement therebetween, if desired. The lower beam 90 is welded or otherwise affixed at connection 64 to arm 60 and extends obliquely therefrom for a distance of about three inches. The other beam 92 is approximately six inches in length and is permanently connected as by welding to the upper channel section 32 along its base plate 40 at connection 94. Lower beam 90 has partial channel walls 96 extending in mutually parallel fashion normally from the beam a distance above connection 64. These channel walls act to confine beam 92 to slide motion along the plane of beam 90. Both beams have confronting elongated slots, slot 100 in lower beam 90 about two inches in length and slot 102 in upper beam 92 about three inches in length. These slots extend through the beam thickness such that a carriage bolt 104 may be placed through both slots with the bolt head 106 outside the joined beams. A wing nut 108 with a suitable lock washer 109 may be threaded onto the bolt 104 at the opposite end outside the other beam. By tightening nut 108 against one beam, the beams are locked together to fix the distance between the arms of lower section 34 and base plate 40 of the upper section 32. These slots allow this distance between the upper and lower sections to be adjusted over a range of above seven inches. To adjust this distance, nut 108 is loosened and thereafter may be locked when the proper distance has been set. This range of adjustment allows the device to be used interchangeably on all makes of automobiles and trucks.

It should be noted that intermediate section 36 is oblique to the general direction plane of lower section 34, and that base plate 40 and the upper section 32 are oblique to the intermediate section 36. The upper section 32 is oblique to the lower section 34 by this construction, and with the bottom arms 60 and 62 of the lower section held generally horizontal the upper section will fit under wheel spoke 17 for tightening thereto.

To use the invention, the lower wing nut 84 is loosened on the bolt 82 to permit the bolt 82 to pivot in the slot 72 and release the arm 60. The arms 60 and 62 are separated and the opening 70 between these arms is fitted about the steering column housing 22. Then the front wheels of the auto are aligned by turning the steering wheel the required amount to a position generally parallel to the vehicle longitudinal axis. Carriage bolt 82 is reinserted through opening 80, and slot 72 and suitable lock washers followed by wing nut 84 are placed on the bolt. Nut 84 is tightened to lock lower section 34 to the stationary housing at a level such that the upper channel section 32 is aligned below a steering wheel spoke with the front wheels in a fixed position relative to the auto longitudinal axis. Thumbscrew 46 and wing nut 48 are loosened and the screw 46 is withdrawn to allow spoke 17 to remain above the open channel of upper section 32. Bolt 104 in intermediate arm 36 is loosened by loosening wing nut 108, and the upper beam 92 is slid upwardly within channel walls 96 until thumbscrew 46 is in the same horizontal plane as the spoke 17 of the steering wheel. At that level wing nut 108 is tightened on bolt 104 locking intermediate arm 36 in position to the lower section 34. The wheel spoke is aligned in the upper channel section and wing nut 48 is loosened. Thumbscrew 46 is tightened to compress the wheel spoke 17 between upright 42 and the lead tip 51 of the thumbscrew. At this time, wing nut 48 is tightened against the emboss 50 to lock the thumbscrew tip against the wheel spoke.

When the clamp device 30 has been installed, the position of the steering wheel is locked to the stationary steering column casing and the front wheels are thereby locked in a fixed angular position relative to the automobile longitudinal axis so that the wheels may rotate but may not pivot or otherwise change their position with respect to the automobile longitudinal axis. The force applied at the steering wheel to control the wheels utilizes the mechanical advantage of the steering gear mechanism and as a result a comparatively small amount of pressure is applied to the steering wheel when compared to the force applied to the front wheels to cause sidewise movement.

With the front wheels locked from sidewise or pivotal movement, the car may be towed by raising the rear end on a tow truck and the front wheels will rotate. The automobile front wheels will rotate about their axes and the automobile will retain its angular relationship with the wheels and will follow the tow truck without veering and without shifting its position relative to the tow truck.

At the conlusion of a towing operation, the device 30 may be loosened and removed in an obvious manner and kept pending the next use.

While there has been described what is at present thought to be a preferred embodiment of the invention, it will be understood that it is the intent to cover in the appended claims all such modifications as fall within the true spirit and scope of the invention.

The invention claimed is:

1. A device for use on the rotatable steering wheel of a motor vehicle wherein the steering wheel includes an outer rim from which there extends a plurality of spokes inwardly directed to a hub, said hub being connected to a steering column rotatably disposed within a tubular housing, and the tubular housing being stationarily mounted on the vehicle: the device comprising, in combination, a pair of arms, a hinge connection between one end of each of the arms for mounting said arms for pivotal movement, each of said arms including an arcuate portion extending from the other arm and the arcuate portions confronting each other and being shaped to fit about the tubular housing, a releasable lock mechanism engaging the other end of both arms for locking said arms to the tubular housing, a first elongated rigid member secured to one of the arms and extending toward the steering wheel in the plane of the axis of the housing, the axis of elongation of said first rigid member being disposed at an acute angle relative to the central axis of the tubular housing, a second elongated rigid member having a portion slidably abutting a portion of the first rigid elongated member with the axes of elongation of the first and second members disposed parallel to each other, one of said members having a pair of spaced outwardly extending flanges parallel to the axis of elongation of said member forming a channel and the other member having a pair of parallel walls parallel to the axis of elongation of said other member slidably engaging the channel forming flanges, one of said members having an aperture and the other of said members having an elongated slot disposed parallel to the axis of elongation of the said member and confronting the aperture, a threaded bolt extending through the aperture and the slot having a head, a nut threadedly engaging the bolt, the nut and head abutting the remote surfaces of the first and second members for locking the members against translation, and means located on the second member at the end thereof remote from the first member defining a seat adapted to engage a spoke of the wheel, said means securing the spoke against rotation thereof about the axis of the steering column.

2. A device for use on the rotatable steering wheel of a motor vehicle wherein the steering wheel includes an outer rim from which there extends a plurality of spokes inwardly directed to a hub, said hub being connected to a steering column rotatably disposed within a tubular housing, and the housing being stationarily affixed to the vehicle; comprising the combination of claim 9 wherein the means defining a seat for engaging a spoke of the steering wheel comprises a U-shaped bracket mounted on the end of the second member remote from the first member and including a pair of parallel walls and an interconnecting flat portion, said means including a layer of compliant material disposed on the flat portion of the U-shaped bracket, said means also including an elongated threaded bolt threadedly engaging an aperture in one of the walls of the bracket and extending normal to the plane of the axis of elongation of the first member and axis of the housing, the spoke of the steering wheel being adapted to engage the compliant layer and be wedged between the end of the threaded bolt of the wall of the bracket confronting the end of said threaded volt.

References Cited by the Examiner

UNITED STATES PATENTS

| 622,257 | 4/99 | Pavia | 74—586 X |
|---|---|---|---|
| 1,228,603 | 6/17 | Sabah | 74—495 X |
| 1,607,720 | 11/26 | Blaeker | 74—495 X |
| 1,709,839 | 4/29 | Chittenden, et al. | 74—495 X |
| 1,943,704 | 1/34 | Topfer | 74—495 X |
| 3,124,011 | 3/64 | Roth | 74—495 |

FOREIGN PATENTS 94,655 10/23 Austria.

BROUGHTON G. DURHAM, *Primary Examiner.*